United States Patent
Kadokura et al.

[11] Patent Number: 6,147,821
[45] Date of Patent: Nov. 14, 2000

[54] PENTA PRISM MASK

[75] Inventors: Susumu Kadokura, Sagamihara; Naoya Saitoh, Yokohama; Tomoaki Kato, Sagamihara, all of Japan

[73] Assignee: Canon Kabushiki Kaisha, Tokyo, Japan

[21] Appl. No.: 08/958,370

[22] Filed: Oct. 27, 1997

[30] Foreign Application Priority Data

Oct. 29, 1996 [JP] Japan ............................ 8-286648

[51] Int. Cl.⁷ ............................................. G02B 5/04
[52] U.S. Cl. ........................ 359/834; 359/585; 204/471; 396/384
[58] Field of Search .................... 359/834, 835, 359/836, 894, 601, 614, 580, 590, 585, 581, 583, 586, 589; 204/471, 484, 486; 396/384, 385, 386

[56] References Cited

U.S. PATENT DOCUMENTS

| | | | |
|---|---|---|---|
| 4,952,956 | 8/1990 | Kikuchi | 396/384 |
| 5,676,812 | 10/1997 | Kadokura | 204/486 |
| 5,747,152 | 5/1998 | Oka et al. | 359/580 |

*Primary Examiner*—Thong Nguyen
*Assistant Examiner*—Mark A. Robinson
*Attorney, Agent, or Firm*—Fitzpatrick, Cella, Harper & Scinto

[57] ABSTRACT

A penta prism mask havimg having an antireflective coating film on its surface, the antireflective coating film being an electrodeposition coating film formed by electrophoretic deposition using an electrodeposition paint comprising a dispersion of a resin and fine particles.

31 Claims, 8 Drawing Sheets

PENTA PRISM MASK

BACKGROUND OF THE INVENTION

1. Field of the Invention

The present invention relates to antireflective penta prism masks for cameras and 8-mm video cameras.

2. Related Background Art

Coating films for preventing the reflection of light on penta prism masks have been formed by a spray coating process. In the spray coating process, however, a large amount of antireflective filler corresponding to twice the quantity of the coating resin is dispersed in the coating solution, hence antireflective filler scaling that comes off after coating due to a reduced binding effect ("scaling off") adheres to the inner wall of the penta prism box unit, resulting in deterioration of the function of the penta prism box unit.

SUMMARY OF THE INVENTION

It is an object of the present invention to provide a penta prism mask having an antireflective coating film which prevents the antireflective filler from scaling off.

It is another object of the present invention to provide a penta prism mask having excellent antireflective characteristics.

In accordance with the present invention, a penta prism mask is provided with an antireflective coating film on its surface, wherein the antireflective coating film is an electrodeposition coating film formed by electrophoretic deposition using an electrodeposition paint comprising a dispersion of a resin and fine particles.

The antireflective coating film formed on the penta prism mask by electrophoretic deposition does not result in the fine particles, which function as an antireflective filler, being scaled off, and thus prevents deterioration of the penta prism box unit.

DETAILED DESCRIPTION OF THE PREFERRED EMBODIMENTS

Figure 1A:
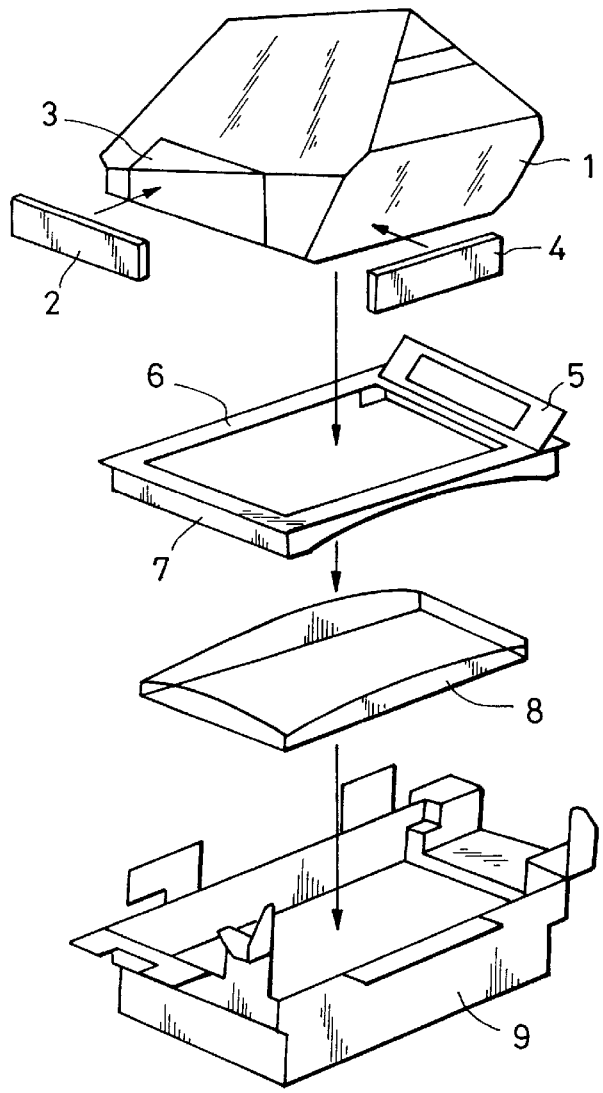
FIG. 1A is an assembly view of a penta prism box unit.
Figure 1B:
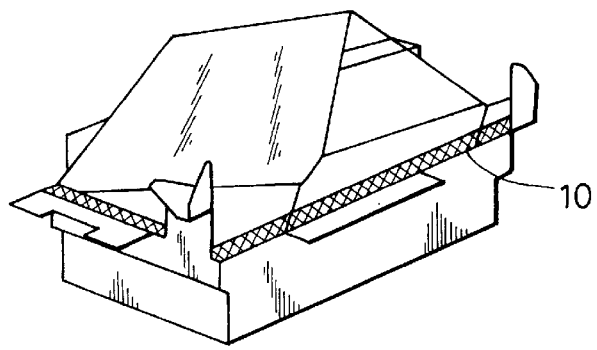
FIG. 1B is an isometric view of the penta prism box unit.

FIG. 1A is an assembly view of a typical penta prism box unit. A penta prism 1 refracts light from a lens and directs it to a finder. A spacer 2 is bonded to a side face of the penta prism 1 by an adhesive tape 3, and a spacer 4 is bonded to the front face of the penta prism 1. The penta prism mask 6 is provided to display clearly the periphery of the image in the finder and is provided with an antireflective coating film on the surface to prevent formation of a ghost image and internal reflection. It is preferable that a condenser spacer 7 be bonded to the penta prism mask 6, and antireflective treatment by electrodeposition coating is performed on a finder display mask 5 which is adhered to or is provided near the penta prism 6. A condenser lens 8 lights up the finder. After the condenser lens 8, the penta prism mask 7 and the penta prism 1 are assembled into a holder 9, the penta prism 1 is fixed to the holder 9 by a spring (not shown in the drawings) provided in a pressor plate (not shown in the drawings). After the fixation, as shown in FIG. 1B, the gap between the penta prism and the holder is sealed with a sealant 10 to prevent invasion of dust.

In the present invention, an antireflective coating film formed by electrodeposition coating prevents scaling of antireflective filler from the antireflective coating film on the penta prism mask due to friction and vibration which occur while assembling the penta prism mask and the penta prism into the holder. The electrodeposition coating film is formed on a metallic or nonmetallic mask substrate by an electrophoretic coating process using an electrodeposition paint containing fine particles, which function as an antireflective filler, in an electrodepositing resin. When using a nonmetallic mask substrate made of, for example, a resin, the electrodeposition is performed after the surface of the mask substrate is subjected to conductive treatment, e.g. metal plating by a chemical plating process.

Examples of resins used in the electrodeposition paint include anionic resins and cationic resins, for example, acrylic-melamine resins, acrylic resins, epoxy resins, urethane resins and alkyd resins.

In the anionic resins, anionic groups, such as a carboxylic group and a sulfone group, are introduced into, for example, acrylic resins, maleic resins, polyester resins, epoxy resins and polybutadiene resins. These resins are dissolved or dispersed in an aqueous solvent containing a basic material, such as triethylamine, diethylamine, dimethylethanol, or ammonia, as an electrodeposition paint.

In the cationic resins, cationic groups, such as an amino group, an ammonium salt group and an imide group, are introduced into, for example, epoxy resins, acrylic resins, urethane resins, polyamide resins and polybutadiene resins. These resins are dissolved or dispersed in an aqueous solvent containing an acidic material, such as formic acid, acetic acid or propionic acid, as an electrodeposition paint.

In the electrodeposition process, the mask substrate is used as an anode when using an anionic paint, or as a cathode when using a cationic paint. The anionic resin molecules migrate to the surface of the mask substrate when it is an anode, react with protons ($H^+$) which are formed at the anode by the electrolysis of water, and are deposited on the surface as an electrodeposition coating film. In contrast, the cationic resin molecules migrate to the surface of the mask substrate when it is a cathode, react with hydroxyl anions ($OH^-$) which are formed at the cathode by electrolysis of water, and are deposited on the surface as an electrodeposition coating film. The mask substrate is removed from the electrodeposition vessel, washed and subjected to hydro-extraction. It is preferred that the electrodeposition coating film be cured by heating or light irradiation to improve weather resistance and chemical resistance. For example, the anionic resin is cured by reacting hydroxyl groups or methylolated amide groups with an amino resin, such as a melamine resin or a benzoguanamine resin. The amino resin acts as a crosslinking agent. The anionic resin can also be cured by oxidation polymerization of double bonds in the resin molecules. The cationic resin is cured by, for example, reacting hydroxyl groups in the cationic resin molecules or amino groups introduced in the cationic resin molecules with an isocyanate compound, by oxidation polymerization, or by an ester exchange reaction.

Examples of fine particles as antireflective fillers include metallic powders, metallic foils and short metallic fibers which are made of aluminum, copper, nickel and silver; metal oxides, such as antimony oxide, indium oxide and tin oxide; and other materials, e.g. carbon fiber, carbon black and graphite powder.

It is preferable that the surface of the electrodeposition coating film formed on the mask substrate have a center-line-average roughness (Ra, according to JISB0601-1982) in a range from 1.7 $\mu$m to 5 $\mu$m to achieve satisfactory antireflective characteristics.

Examples of preferred fine particle materials include aluminum oxide, diatomaceous earth, activated charcoal, zirconium oxide, porous carbon and silicates. Among them, silicates are more preferably used. It is preferable that these fine particles have a porosity of 80% or more.

The porosity (%) of fine particles is calculated by the following equation (1):

$$\text{Porosity} = \left(1 - \frac{s}{d}\right) \times 100 \tag{1}$$

wherein s represents the apparent specific gravity (density) of the particle, and d represents the true specific gravity (density) of the particle. For example, when a porous aluminum oxide has a d of 3.8 and an s of 1, the porous aluminum oxide has a porosity of 73.7%.

Preferably, the quantity of the fine particles dispersed in the paint ranges from 5 to 60 parts by weight to 100 parts by weight of resin.

Figure 2:
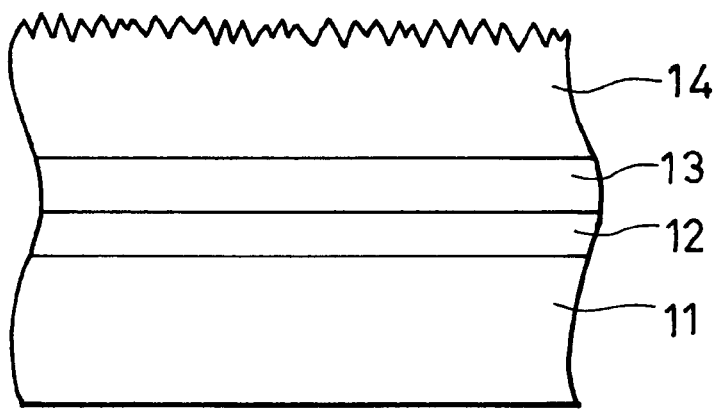
FIG. 2 is a schematic sectional view of a penta prism mask member in accordance with the present invention.
Figure 3:
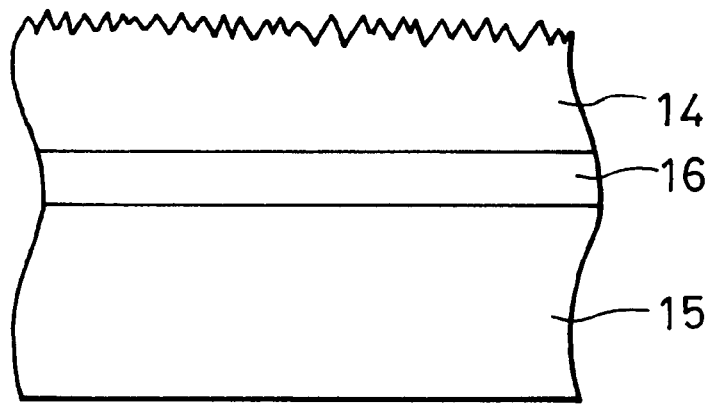
FIG. 3 is a schematic sectional view of another penta prism mask member in accordance with the present invention.

FIG. 2 and FIG. 3 are schematic sectional views of typical penta prism mask members in accordance with the present invention.

In FIG. 2, a plating film 12 is formed on a plastic mask member 11 by a well-known on-plastic plating process, a chemical conversion film 13 is formed thereon by chemical treatment of the plating film 12, and an electrodeposition coating film 14 is formed thereon. The chemical conversion film 13 is, for example, a copper oxide film which is formed by oxidation of a copper plating film 12.

In FIG. 3, a plating film or a chemical conversion film 16 is formed on a metallic member 15 by a well-known plating or chemical conversion process, and an electrodeposition coating film 14 is formed thereon.

In FIGS. 2 and 3, the plating film or the chemical conversion film may be omitted. The surface of the electrodeposition coating film has remarkable irregularity due to the co-deposition effect of the porous fine particles, and improves light-shielding and antireflective characteristics. Further, the electrodeposition coating film has high flaw resistance, weather resistance, adhesiveness and solvent resistance.

A more preferable surface roughness of the electrodeposition coating film is 2 $\mu$m to 4.5 $\mu$m. It is preferable that the surface roughness of the electrodeposition coating film be compact, that is, the number of peaks having distances of 2.5 $\mu$m or more from the average line of the roughness curve per 2-mm length is preferably at least 30, and more preferably at least 40. The number of both concave and convex peaks when the average line is set to a base line are counted.

The gloss of the rough surface depends on the size of the fine particles; that is, a surface with fine particles having a relatively small size is more glossy, whereas a surface with fine particles having a relatively large size is less glossy. Fine particles with an excessively large size, however, will readily scale off from the coating film surface and will cause dust in the product. The particle size is preferably in a range from 5 $\mu$m to 70 $\mu$m, and in particular in a range from 10 $\mu$m to 40 $\mu$m. The particle size can be determined using a centrifugal sedimentation particle size analyzer, for example an, SACP-3 apparatus made by Shimadzu Corporation.

The quantity of the fine particles dispersed in the electrodeposition coating film affects the properties of the product and there is a preferred range in relation to the resin content in the electrodeposition coating film. When the fine particle content is excessively high, the fine particles will readily scale off from the coating film surface forming dust in the product; when the fine particle content is excessively low, the surface of the coating film is glossy. The quantity of the fine particles is preferably in a range from 2 to 50 parts by weight and more preferably from 5 to 40 parts by weight to 100 parts by weight of the resin. The shape of the fine particles is not limited. The electrodeposition paint in accordance with the present invention is prepared as follows. Given amounts of fine particles and resin are mixed in a ball mill for at least 24 hours and diluted with deionized water. The solid content after dilution is preferably 5 to 20 percent by weight, and more preferably 7 to 17 percent by weight. After a pigment is added, if necessary, the pH of the dispersion is adjusted to 7.5 to 8.5.

The light-shielding, antireflective penta prism mask member in accordance with the present invention is prepared as follows. The member to be coated is placed as the anode in an anionic electrodeposition coating process or as the cathode in a cationic electrodeposition coating process. The coating film is formed under the conditions of a bath temperature of 20 to 25° C., an applied voltage of 70 to 200 V, a current density of 0.5 to 5 A/cm$^2$ and a processing time of 1 to 5 minutes. After the coating film is washed with water, it is cured at 70 to 200° C. for 20 to 120 minutes. The thickness of the electrodeposition coating film is determined to be adequate in arrange from 10 to 50 $\mu$m. The content of the porous fine particles in the coating film is preferably 7 to 50 percent by weight, and more preferably 10 to 40 percent by weight.

In the present invention, the electrodeposition coating film can significantly improve the light-shielding and anti-reflective characteristics of the coating film due to the co-deposition effect of the electrodepositing resin and the fine particles dispersed in the resin. The glossiness of the resulting electrodeposition coating film is 0 to 2 at an incident or reflection angle (light-receiving angle) of 60°, wherein a glossiness of 0 represents that no reflected light is observed. A GLOSS METER UGS-300A made by Nippon Denshoku Kogyo Co., Ltd. is used to determine the glossiness.

The resulting electrodeposition coating film has excellent physical properties. For example, the electrodeposition coating film is tightly adhered to the substrate and dust is not found in the product due to the fine particles scaling off which is unavoidable in spray coating or the like. The electrodeposition coating film has a hardness of at least 3H, high solvent resistance, for example, not soluble in methyl ethyl ketone, and an excellent weather resistance of at least 1,000 hours.

The quantity of the co-deposited fine particles is determined by a thermogravimetric analyzer and an X-ray microanalyzer in the present invention. The center-line-average roughness (Ra) is determined by Surfcom, which is made by Tokyo Seimitsu Co., Ltd.

In the present invention, a black coloring agent having high light absorption characteristics, such as carbon black, titanium monoxide powder or magnetite powder, may be added to improve the light-shielding characteristics of the electrodeposition coating film. When the electrodeposition coating film does not contain a black coloring agent, it has an excellent specular appearance.

EXAMPLE 1

An electrodeposition paint was prepared as follows. An aqueous resin solution A containing 15 percent by weight of an acrylic-melamine clear coating (made by Honey Chemicals Co., Ltd., trade name: Honey Bright H-1) was diluted with deionized water such that the total volume is 2 liters, and 1.5 percent by weight of carbon black as a black pigment was added to the solution to prepare a black electrodeposition paint (1).

Further, 5 percent by weight of aluminum oxide having a porosity of 73% and a particle size 10 μm was added to the aqueous resin solution A. The mixture was dispersed in a ball mill for 24 hours and diluted with deionized water to obtain a dispersion of 2 liters, and then 1.5 percent by weight of carbon black as a black pigment was added to the dispersion to prepare an electrodeposition paint (2).

Also, 5 percent by weight of diatomaceous earth having a porosity of 85% and an average particle size of 10 μm (made by Sanshin Seisakusho K.K., trade name: Prelight #4) was added to the aqueous resin solution A. The mixture was dispersed in a ball mill for 24 hours and diluted with deionized water to obtain a dispersion of 2 liters, and then 1.5 percent by weight of carbon black as a black pigment was added to the dispersion to prepare an electrodeposition paint (3).

An iron plate as a penta prism mask substrate, which had been treated with zinc phosphate, was treated with an alkaline degreaser (made by Yuken Kagaku K.K., trade name: Pakuna) and washed thoroughly with water. The substrate was placed at the anode and a 0.5-mm thick stainless steel plate was placed at the counter electrode. Electrodeposition coating was performed under the conditions of a pH range of 8.0 to 8.2, a bath temperature of 20 to 25° C. and a direct current voltage applied to the dispersion in a range from 50 V to 200 V for 2 minutes, in which the voltage was determined stepwise at a 25-volt interval. The substrate was washed with deionized water and heated in an electric oven at 150° C.±1° C. for 30 minutes. The resulting penta prism mask member was used to determine the glossiness, center-line-average roughness (Ra), the number of rough peaks, and the quantity of co-deposited fine particles in the electrodeposition coating film. The results are shown in Table 1. Next, a penta prism box unit as shown in FIG. 1(B) was fabricated and assembled into a camera. Scaling of aluminum oxide, diatomaceous earth and carbon black from the electrodeposition coating film was not observed in the assembled camera.

Another series of electrodeposition paints (1) to (3) were prepared by using an aqueous resin solution B containing 15 percent by weight of an acrylic-melamine resin clear paint instead of the aqueous resin solution A, and the electrodeposition coating films were heated at 95° C.±1° C. instead of 150° C.±1° C. Similar results as above were obtained. No distinct difference was observed between the characteristics of these coating films including 1000-hour weatherability.

TABLE 1

Figure 4:
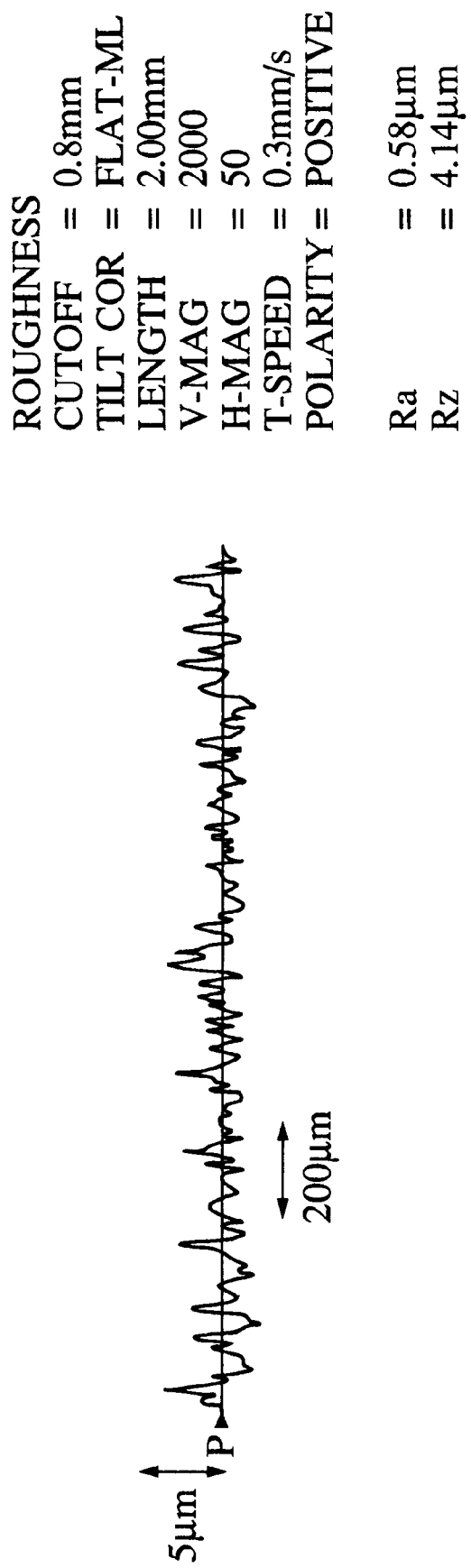
FIG. 4 is a diagram showing a roughness of an electrodeposition coating film.
Figure 5:
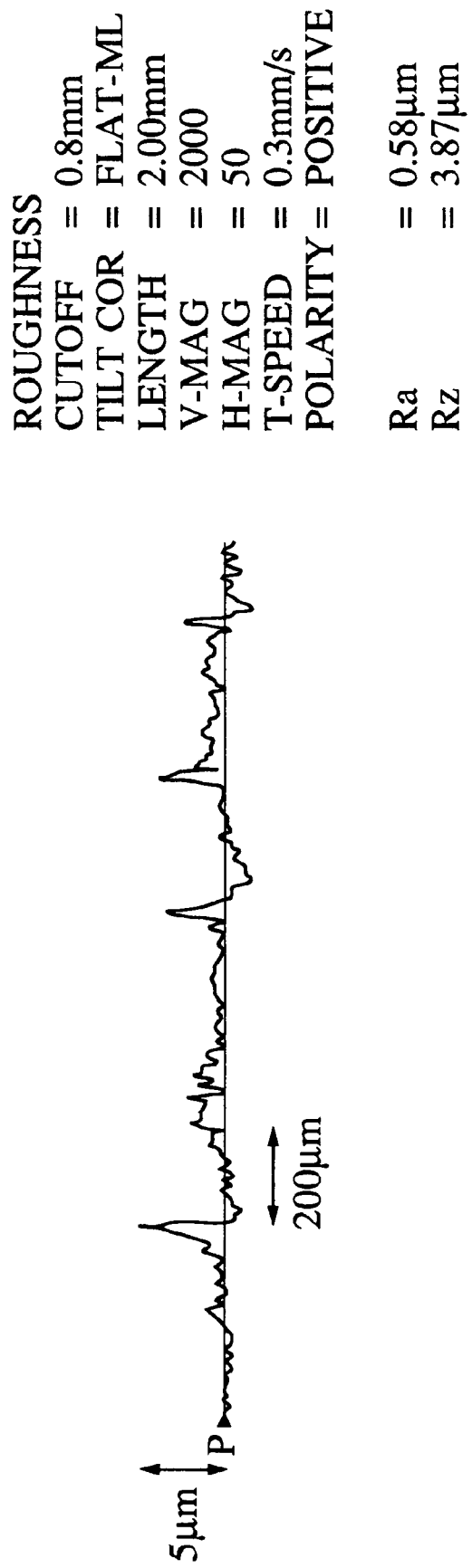
FIG. 5 is a diagram showing a roughness of an electrodeposition coating film.
Figure 6:
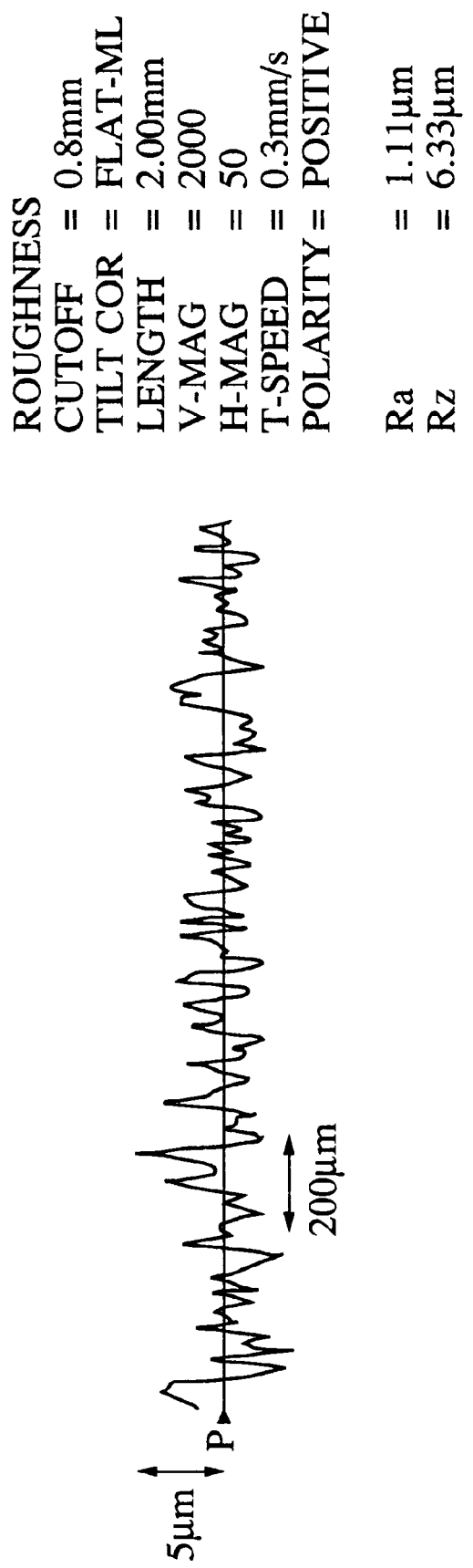
FIG. 6 is a diagram showing a roughness of an electrodeposition coating film.
Figure 7:
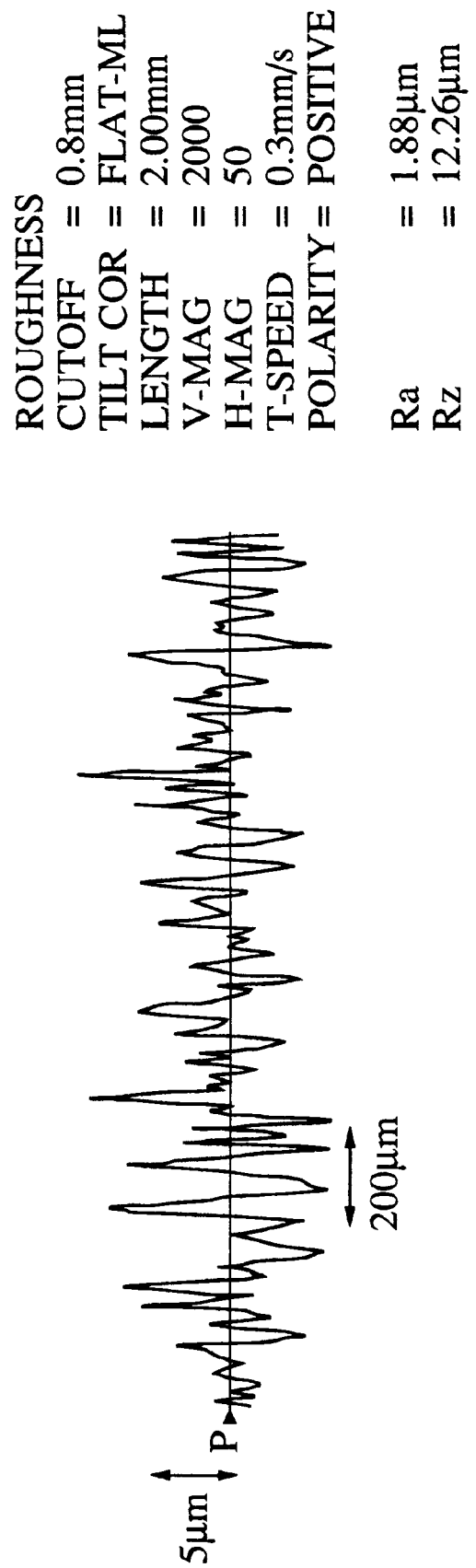
FIG. 7 is a diagram showing a roughness of an electrodeposition coating film.
Figure 8:
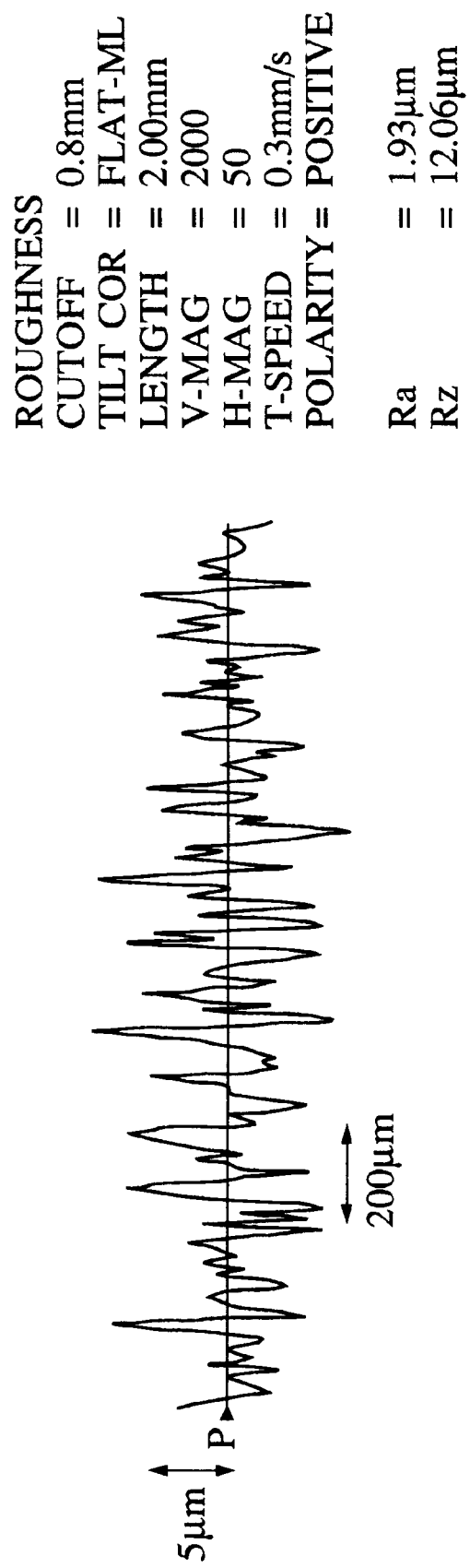
FIG. 8 is a diagram showing a roughness of an electrodeposition coating film.
Figure 9:
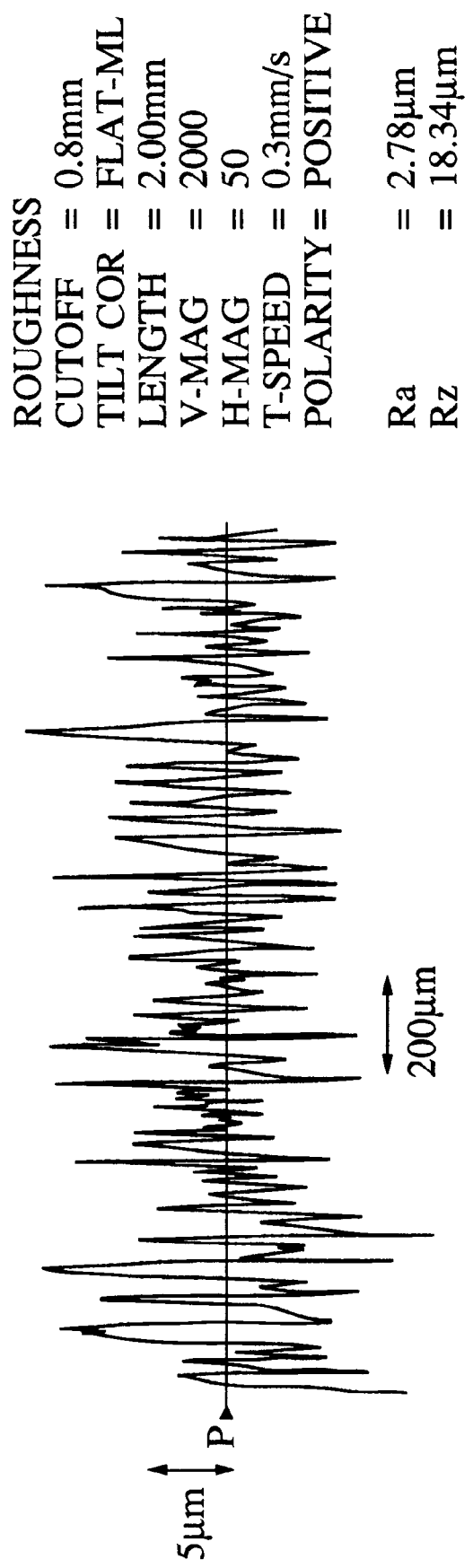
FIG. 9 is a diagram showing a roughness of an electrodeposition coating film.

| Composition | Voltage (V) | Glossiness | Ra (μm) | Number of rough peaks | Co-deposited fine particles |
|---|---|---|---|---|---|
| (1) | 50 | 21 | 0.22 | 0 | 0 |
| Resin (15 wt %) + | 75 | 21 | 0.25 | 0 | 0 |
| Carbon | 100 | 25 | 0.27 | 0 | 0 |
| (1.5 wt %) | 125 | 27 | 0.13 | 0 | 0 |
|  | 150 | 30 | 0.15 | 0 | 0 |
|  | 175 | 30 | 0.17 | 0 | 0 |
|  | 200 | 30 | 0.17 | 0 | 0 |
| (2) | 50 | 21 | 0.31 | 1 | 1 |
| Aluminum oxide (5 wt %) was dispersed into Composition (1) | 75 | 17 | 0.58 | 2 (FIG. 4) | 5 |
|  | 100 | 15 | 0.58 | 3 (FIG. 5) | 10 |
|  | 125 | 7 | 0.72 | 3 | 20 |
|  | 150 | 5 | 1.15 | 13 (FIG. 6) | 30 |
|  | 175 | 5 | 1.33 | 15 | 40 |
|  | 200 | 5 | 1.36 | 15 | 50 |
| (3) | 50 | 2 | 1.81 | 36 (FIG. 7) | 1 |
| Diatomaceous earth (5 wt %) wash dispersed into Composition (1) | 75 | 2 | 1.93 | 35 (FIG. 8) | 5 |
|  | 100 | 1–0 | 2.78 | 78 (FIG. 9) | 10 |
|  | 125 | 0 | 3.21 | 81 | 15 |
|  | 150 | 0 | 4.36 | 87 | 20 |
|  | 175 | 0 | 4.78 | 90 | 30 |
|  | 200 | 0 | 4.75 | 95 | 50 |
| Comparative Example | — | 1–1.2 | 2.75 | 76 | — |

FIG. 4 to FIG. 9 are graphs of roughness curves of examples of Composition (2) at 75 V, 100 V and 150 V, and of Composition (3) at 50 V, 75 V and 100 V, respectively.

Comparative Example

Forty five parts by weight of graphite as a delustering agent, 2 parts by weight of carbon black as a black pigment and 35 parts by weight of an organic solvent (a thinner) were added to 20 parts by weight of an epoxy-melamine clear paint to prepare a spraying paint. The spraying paint, of which the viscosity was adjusted with the same solvent as above to be 17 to 20 seconds in JISK5500 Ford cup No. 4, was sprayed onto both sides of a penta prism mask and a finder display mask, shown in FIG. 1A, made of phosphor bronze to form a coating film with a thickness of 20 to 30 μm using a spray gun at an air pressure of 1.5 kg/cm$^2$ and at a distance between the coated member and the gun of 30 cm, and heated in an electric oven at 150° C.±1° C. for 30 minutes.

The results of the glossiness, center-line-average roughness (Ra) and the number of rough peaks of these two masks are shown in Table 1. Although these masks had light-shielding characteristics, dust formed in the camera fabrication process due to graphite particles being scaled off onto the condenser lens shown in FIG. 1, and unsatisfactory adhesiveness resulted in some problems in quality when the parts came in contact with each other.

EXAMPLE 2

A black electrodeposition paint was prepared as follows. Ten percent by weight of diatomaceous earth having a porosity of 85% (made by Sanshin Seisakusho K.K., trade name: Prelight #40) or 10 percent by weight of activated charcoal having a porosity of 85% and an average particle size of 25 μm (made by Cataler Industrial Co., Ltd., trade name: FM-150) was added into 15 percent by weight of an acrylic-melamine clear coating (made by Honey Chemicals, trade name: Honey Bright C-1L). The mixture was dispersed in a ball mill for 24 hours and diluted with deionized water to obtain a dispersion of 2 liters, and then 1.5 percent by weight of carbon black was added to the dispersion.

An ABS/PS (acrylonitrile-butadiene-styrene/polystyrene) plastic plate as a penta prism mask substrate, which had been degreased, treated with a chromate-sulfuric acid-water etching solution at 70° C. for 10 minutes, treated with a sensitizing solution containing 30 g of stannous chloride and 20 ml of hydrochloric acid per liter at room temperature for 2 minutes, treated with a palladium catalyst to give conductivity and subjected to electroless copper plating using a plating solution (made by Okuno Chemical Industries Co., Ltd., trade name: OPC700) at a bath temperature of 50° C. for 2 hours to form a coating film with a thickness of 5 $\mu$m. A chemical conversion film was formed on the copper plating surface in an alkaline chemical conversion solution at 50° C. for 1 minute. The copper-coated substrate was placed at the anode and a 0.5-mm thick stainless steel plate was placed at the counter electrode. Electrodeposition coating was performed under the conditions of a pH range of 8.0 to 8.2, a bath temperature of 20 to 25° C. and a direct current voltage applied to the dispersion in a range from 50 V to 200 V for 2 minutes, in which the voltage was determined stepwise at a 25-volt interval. The substrate was washed with deionized water and heated in an electric oven at 95° C.±1° C. for 30 minutes. The resulting penta prism mask member was used to determine the glossiness, center-line-average roughness (Ra), the number of rough peaks, the quantity of co-deposited fine particles in the electrodeposition coating film. The results are shown in Table 2. Next, a penta prism box was fabricated and assembled into a camera. Satisfactory results were obtained as in Example 1.

TABLE 2

| Composition | Voltage (V) | Glossiness | Ra ($\mu$m) | Number of rough peaks | Co-deposited fine particles |
| --- | --- | --- | --- | --- | --- |
| (4) | 50 | 2–1 | 2.00 | 31 | 2 |
| Diatomaceous | 75 | 1 | 2.51 | 40 | 7 |
| earth (10 wt %) | 100 | 1–0 | 2.74 | 70 | 12 |
| was dispersed | 125 | 1–0 | 3.03 | 79 | 16 |
| into | 150 | 0 | 4.23 | 85 | 20 |
| Composition (1) | 175 | 0 | 4.34 | 87 | 37 |
| | 200 | 0 | 4.50 | 90 | 50 |
| (5) | 50 | 3 | 1.68 | 29 | 3 |
| Activated | 75 | 2–1 | 1.91 | 32 | 5 |
| charcoal | 100 | 1 | 2.63 | 35 | 7 |
| (10 wt %) was | 125 | 1 | 2.65 | 35 | 10 |
| dispersed into | 150 | 1–0 | 2.92 | 41 | 15 |
| Composition (1) | 175 | 1–0 | 3.01 | 41 | 20 |
| | 200 | 1–0 | 3.13 | 48 | 30 |

What is claimed is:

1. A penta prism mask comprising:
   a mask surface; and
   an antireflective coating film formed on said mask surface, said antireflective coating film including an electrodeposition coating film formed by co-depositing by electrophoretic deposition an electrodeposition paint including a dispersion of a resin and fine particles.

2. A penta prism mask according to claim 1, further comprising a metal substrate, said antireflective coating film being formed on said metal substrate.

3. A penta prism mask according to claim 2, wherein said antireflective coating film further comprises one of a plating film and a chemical conversion film formed on a surface of the metallic substrate, wherein said electrodeposition coating film is applied to a surface of the one of the plating film and the chemical conversion film.

4. A penta prism mask according to claim 1, wherein said electrodeposition coating film has a center-line-average surface roughness of 1.7 $\mu$m to 5 $\mu$m.

5. A penta prism mask according to claim 1, wherein said electrodeposition coating film has a center-line-average surface roughness of 2 $\mu$m to 4.5 $\mu$m.

6. A penta prism mask according to claim 1, wherein a number of rough peaks having a distance from an average line of a roughness curve of said electrodeposition coating film of 2.5 $\mu$m or more is at least 30 per 2-mm length.

7. A penta prism mask according to claim 6, wherein the number of rough peaks is at least 40 per 2-mm length.

8. A penta prism mask according to claim 1, wherein said fine particles are silicide.

9. A penta prism mask according to claim 1, wherein said fine particles have a porosity of 80% or more.

10. A penta prism mask according to claim 1, wherein said fine particles have an average particle size of 5 $\mu$m to 70 $\mu$m.

11. A penta prism mask according to claim 1, wherein said electrodeposition coating film contains a black coloring agent to provide light-shielding characteristics.

12. A penta prism mask according to claim 11, wherein the surface of said electrodeposition coating film has a glossiness of 2 or less.

13. A penta prism mask according to claim 1, wherein said antireflective coating film further comprises a plating film formed on a surface of a mask member, and a chemical conversion film being formed on a surface of said plating film, and wherein said electrodeposition coating film is formed on a surface of said chemical conversion film.

14. A penta prism mask according to claim 1, wherein the quantity of fine particles is in a range of 2 to 50 parts per 100 by weight of the resin.

15. A penta prism mask according to claim 1, wherein the quantity of fine particles is in a range of 5 to 40 parts per 100 by weight of the resin.

16. A method of forming a penta prism mask, comprising the steps of:
   dispersing fine particles and a resin in an electrodeposition paint; and
   forming on a mask substrate by co-deposition an antireflective coating film having an electrodeposition coating film formed by the electrodeposition paint including the dispersion of resin and fine particles.

17. A method of forming a penta prism mask according to claim 16, wherein said forming step includes an electrophoretic deposition method.

18. A method of forming a penta prism mask according to claim 16, further comprising the steps of:
   forming a plating film on a surface of a mask member;
   forming a chemical conversion film on a surface of the plating film; and
   forming the electrodeposition coating film on a surface of the chemical conversion film.

19. A method of forming a penta prism mask according to claim 16, further comprising the step of providing a metal substrate, wherein the antireflective coating is formed during said forming step on a surface of said metal substrate.

20. A method of forming a penta prism mask according to claim 19, further including the steps of forming one of a plating film and a chemical conversion film on a surface of the metallic substrate, and applying the electrodeposition coating film to a surface of the one of the plating film and the chemical conversion film.

21. A method of forming a penta prism mask according to claim 16, wherein said electrodeposition coating film is formed with a center-line-average surface roughness of 1.7 $\mu$m to 5 $\mu$m.

22. A method of forming a penta prism mask according to claim 16, wherein said electrodeposition coating film is formed with a center-line-average surface roughness of 2 µm to 4.5 µm.

23. A method of forming a penta prism mask according to claim 16, wherein the electrodeposition film is formed with a number of rough peaks having a distance from an average line of a roughness curve of 2.5 µm or more is at least 30 per 2-mm length.

24. A method of forming a penta prism mask according to claim 23, wherein the electrodeposition film is formed with the number of rough peaks is at least 40 per 2-mm length.

25. A method of forming a penta prism mask according to claim 16, wherein in said dispersing step the fine particles are silicide.

26. A method of forming a penta prism mask according to claim 16, wherein in said dispersing step the fine particles have a porosity of 80% or more.

27. A method of forming a penta prism mask according to claim 16, wherein in said dispersing step the fine particles have an average particle size of 5 µm to 70 µm.

28. A method of forming a penta prism mask according to claim 16, wherein the electrodeposition coating film is formed with a black coloring agent to provide light-shielding characteristics.

29. A method of forming a penta prism mask according to claim 28, wherein the surface of the electrodeposition coating film is formed with a glossiness of 2 or less.

30. A method according to claim 16, wherein the dispersing step includes dispersing a quantity of fine particles in a range of 2 to 50 parts per 100 by weight of the resin.

31. A method according to claim 16, wherein the dispersing step includes dispersing a quantity of fine particles in a range of 5 to 40 parts per 100 by weight of the resin.

* * * * *

UNITED STATES PATENT AND TRADEMARK OFFICE
CERTIFICATE OF CORRECTION

PATENT NO. : 6,147,821
DATED : November 14, 2000
INVENTOR(S) : SUSUMU KADOKURA, ET AL.

It is certified that error appears in the above-identified patent and that said Letters Patent is hereby corrected as shown below:

At [57] ABSTRACT

Line 1, "having" should be deleted.

At Column 4

Line 12, "example" should read --example,--.
　　Line 13, "an," should read --an--.
　　Line 44, "arrange" should read --a range--.
　　Line 62, "off" should read --off,--.

Column 5

Line 67, "Similar" should read --Very similar--.

Column 9

Line 8, "is" should be deleted.
　　Line 12, "is" should be deleted.

Signed and Sealed this

Twenty-ninth Day of May, 2001

Attest:

NICHOLAS P. GODICI

Attesting Officer    Acting Director of the United States Patent and Trademark Office